United States Patent
Yoshida (10) Patent No.: US 11,487,215 B2
(45) Date of Patent: Nov. 1, 2022

(54) OPTICAL DEFLECTOR, OPTICAL SCANNING DEVICE EQUIPPED THEREWITH, AND IMAGE FORMING APPARATUS

(71) Applicant: KYOCERA Document Solutions Inc., Osaka (JP)

(72) Inventor: Shingo Yoshida, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/335,170

(22) Filed: Jun. 1, 2021

(65) Prior Publication Data
US 2021/0382411 A1    Dec. 9, 2021

(30) Foreign Application Priority Data
Jun. 8, 2020 (JP) .............................. JP2020-099511

(51) Int. Cl.
*G03G 15/04* (2006.01)
*G02B 26/12* (2006.01)

(52) U.S. Cl.
CPC ....... *G03G 15/04036* (2013.01); *G02B 26/12* (2013.01); *G03G 15/0409* (2013.01)

(58) Field of Classification Search
CPC ............. G02B 26/12; G03G 15/04036; G03G 15/0409
See application file for complete search history.

(56) References Cited

U.S. PATENT DOCUMENTS

| 8,780,158 B2 * | 7/2014 | Hudson ................ G02B 26/123 347/245 |
| 10,018,962 B2 * | 7/2018 | Sue .................. G03G 15/04036 |
| 2017/0299975 A1 * | 10/2017 | Mizutani ............ G02B 27/0006 |
| 2017/0299976 A1 * | 10/2017 | Mizutani .............. G02B 26/123 |
| 2020/0166864 A1 * | 5/2020 | Yoshida ........... G03G 15/04036 |

FOREIGN PATENT DOCUMENTS

JP        2017-191257        10/2017

* cited by examiner

*Primary Examiner* — Walter L Lindsay, Jr.
*Assistant Examiner* — Geoffrey T Evans
(74) *Attorney, Agent, or Firm* — Lex IP Meister, PLLC (57) ABSTRACT

In an optical deflector, a polygon mirror and a drive motor are covered by a cover body including a first cover portion and a second cover portion. The first cover portion includes a top wall disposed above the polygon mirror, and a peripheral wall formed having a cylindrical shape extending downward from an outer peripheral end edge of the top wall and having a first opening opened by facing the deflection surface of the polygon mirror. The peripheral wall has an upper-end edge-defining portion and a lower-end edge-defining portion defining an opening end edge of the first opening, and the top wall has, on an inner surface side of a specific portion connected to the upper-end edge-defining portion, a first slope portion inclined downward toward the upper-end edge-defining portion.

4 Claims, 10 Drawing Sheets

OPTICAL DEFLECTOR, OPTICAL SCANNING DEVICE EQUIPPED THEREWITH, AND IMAGE FORMING APPARATUS

INCORPORATION BY REFERENCE

This application is based upon, and claims the benefit of priority from, corresponding Japanese Patent Application No. 2020-099511 filed in the Japan Patent Office on Jun. 8, 2020, the entire contents of which are incorporated herein by reference.

BACKGROUND

Field of the Invention

The present disclosure relates to an optical deflector having a polygon mirror, an optical scanning device equipped therewith, and an image forming apparatus.

Description of Related Art

Typically, an image forming apparatus such as a color printer equipped with an optical deflector is known. This type of optical deflector is equipped with a drive motor having a rotation shaft and a polygon mirror that deflects emitted light while rotating in unison with the rotation shaft and scans an image carrier for carrying an electrostatic latent image.

SUMMARY

An optical deflector according to one aspect of the present disclosure includes a drive motor having a motor body and a rotation shaft projecting upward from the motor body, a polygon mirror attached to an upper end portion of the rotation shaft, having a peripheral surface which is irradiated with light, deflecting the light with which the peripheral surface is irradiated while rotating in unison with the rotation shaft, and scanning a specific irradiated body, and a cover body including a first cover portion that covers the polygon mirror from above and a second cover portion that is connected to a lower end of the first cover portion and covers the drive motor from the side. The first cover portion includes a plate-shaped top wall disposed above the polygon mirror, and a peripheral wall formed having a cylindrical shape extending downward from an outer peripheral end edge of the top wall, with a lower end connected to the second cover portion, and having an opening opened by facing the peripheral surface of the polygon mirror. The peripheral wall has an upper-end edge-defining portion that defines an upper end edge of the opening and is connected to the top wall, and a lower-end edge-defining portion that defines a lower edge of the opening end edge and is connected to the second cover portion. The top wall has, on an inner surface side of the specific portion connected to the upper-end edge-defining portion, a first slope portion that is inclined downward toward the upper-end edge-defining portion.

According to this optical deflector, the polygon mirror and the drive motor are covered by a cover body including a first cover portion and a second cover portion. In the cover body, the first cover portion covers the polygon mirror from above and the second cover portion covers the drive motor from the side. The first cover portion includes a top wall disposed above the polygon mirror, and a peripheral wall formed having a cylindrical shape extending downward from an outer peripheral end edge of the top wall and having an opening opened by facing the peripheral surface of the polygon mirror. In the first cover portion having this configuration, the peripheral wall has an upper-end edge-defining portion and a lower-end edge-defining portion that define an opening end edge of the opening, and the top wall has a first slope portion that is inclined downward toward the upper-end edge-defining portion on an inner surface side of a specific portion connected to the upper-end edge-defining portion.

When the polygon mirror rotates in unison with the rotation shaft of the drive motor, an air stream of an air flow is generated inside the cover body. Although there are a wide variety of air flow directions inside the cover body, the rotation of the polygon mirror generates a main air flow that rises from the second cover portion toward the first cover portion and flows along the inner surface of the top wall of the first cover portion. This main air flow is the strongest air flow among the air flows generated by the rotation of the polygon mirror. In other words, the polygon mirror is configured to generate the main air flow inside the cover body by rotating with the rotation shaft.

An optical scanning device according to another aspect of the present disclosure includes the optical deflector described above and a light source that irradiates the peripheral surface of the polygon mirror with light.

Further, an image forming apparatus according to another aspect of the present disclosure includes the optical scanning device described above and an image carrier as the irradiated body, which is scanned by the polygon mirror and on whose surface an electrostatic latent image is formed.

DETAILED DESCRIPTION

Figure 1:
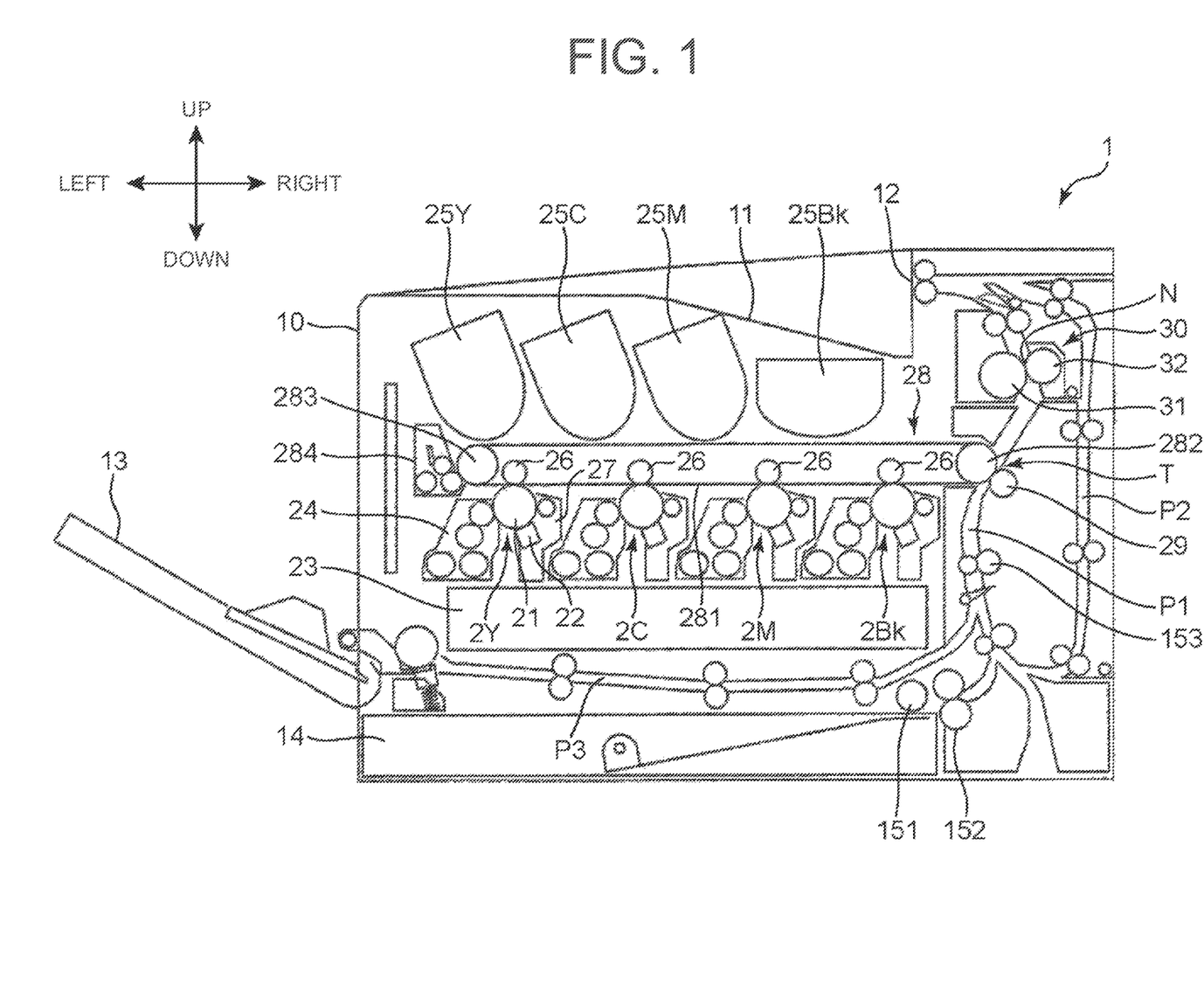
FIG. 1 is a cross-sectional view showing a schematic configuration of an image forming apparatus according to one embodiment of the present disclosure.

Hereinafter, an optical deflector, an optical scanning device, and an image forming apparatus according to an embodiment of the present disclosure will be described on the basis of the drawings. FIG. 1 is a cross-sectional view showing a schematic configuration of an image forming apparatus 1 according to one embodiment of the present disclosure. The image forming apparatus 1 is a tandem-type color printer and includes a main housing 10 composed of a substantially cuboid housing. The image forming apparatus 1 may be a full-color copier or a multifunction machine.

The main housing 10 accommodates a plurality of processing units that perform image performing processing on sheets therein. In this embodiment, the processing units include image forming units 2Y, 2C, 2M, 2Bk, an optical scanning device 23, an intermediate transfer unit 28, and a fixing device 30. A paper ejection tray 11 is provided on an upper surface of the main housing 10. A sheet ejection port 12 is opened by facing the paper ejection tray 11. A manual paper-feed tray 13 is attached to a side wall of the main housing 10, capable of opening/closing. A paper feed cassette 14 which accommodates a sheet to be subjected to image formation processing is detachably attached to a lower part of the main housing 10.

The image forming units 2Y, 2C, 2M, and 2Bk form toner images in yellow (Y), cyan (C), magenta (M), and black (Bk) colors on the basis of image information transmitted from an external device such as a computer, and are arranged in tandem in a horizontal direction at specific intervals. Each of the image forming units 2Y, 2C, 2M, and 2Bk includes: a photosensitive drum 21 (image carrier) having a cylindrical body shape that carries an electrostatic latent image and a toner image; a charger 22 that charges a drum peripheral surface of the photosensitive drum 21; a developing device 24 that attaches a developer to the electrostatic latent image so as to form a toner image; yellow, cyan, magenta, and black toner containers 25Y, 25C, 25M, and 25Bk that supply toner in each color to the developing device 24; a primary transfer roller 26 that performs primary transfer of the toner image formed on the photosensitive rum 21; and a cleaning device 27 that removes residual toner from the peripheral surface of the photosensitive drum 21.

In the following description, when the photosensitive drum 21 provided in each of the image forming units 2Y, 2C, 2M, and 2Bk is specifically described, the photosensitive drum provided in the image forming unit 2Y is referred to as the "first photosensitive drum 21Y", the photosensitive drum provided in the image forming unit 2C is referred to as the "second photosensitive drum 21C", the photosensitive drum provided in the image forming unit 2M is referred to as the "third photosensitive drum 21M", and the photosensitive drum provided in the image forming unit 2Bk is referred to as the "fourth photosensitive drum 21Bk".

The optical scanning device 23 forms an electrostatic latent image on the drum peripheral surface of the photosensitive drum 21 of each color. The optical scanning device 23 of this embodiment includes an incident optical system having a plurality of light sources prepared for each color, an optical deflector that deflects light beams emitted from these light sources, and an image-forming optical system that causes the light beams deflected by the optical deflector to form images on the drum peripheral surface of the photosensitive drum 21 of each color and to perform scanning. This optical scanning device 23 will be described in detail below.

The intermediate transfer unit 28 performs primary transfer of the toner image formed on the photosensitive drum 21. The intermediate transfer unit 28 includes a transfer belt 281 that circulates in contact with the drum peripheral surface of each photosensitive drum 21, and a drive roller 282 and a driven roller 283 over which the transfer belt 281 is extended. The transfer belt 281 is pressed against the drum peripheral surface of each photosensitive drum 21 by the primary transfer roller 26. The toner images on the photosensitive drum 21 of each color are superimposed on the same spot on the transfer belt 281 and primarily transferred. As a result, a full-color toner image is formed on the transfer belt 281.

A secondary transfer roller 29 is disposed by facing the drive roller 282 so as to form a secondary transfer nip section T with the transfer belt 281 therebetween. The full-color toner image on the transfer belt 281 is secondarily transferred onto the sheet in the secondary transfer nip section T. A toner that remains on the peripheral surface of the transfer belt 281 which was not transferred onto the sheet is collected by a belt cleaning device 284 disposed by facing the driven roller 283.

The fixing device 30 includes a fixing roller 31 in which a heat source is built in, and a pressure roller 32 forming a fixing nip section N together with the fixing roller 31. The fixing device 30 applies a fixing process that deposits the toner to the sheet on which the toner image has been transferred in the secondary transfer nip section T by heating and pressurizing the sheet in the fixing nip section N. The sheets that have undergone the fixing process are ejected from the sheet ejection port 12 toward the paper ejection tray 11.

A sheet conveying path for conveying a sheet is provided inside the main housing 10. The sheet conveying path includes a main conveying path P1 extending in a vertical direction from near a lower part of the main housing 10 to the vicinity of an upper part through the secondary transfer nip section T and the fixing device 30. A downstream end of the main conveying path P1 is connected to the sheet ejection port 12. A reversing conveying path P2, which reverses and conveys the sheet during double-sided printing, extends from the down most stream end of the main conveying path P1 to the vicinity of the upstream end. A conveying path P3 for manual feed sheets from a manual paper-feed tray 13 to the main conveying path P1 is disposed above the paper feed cassette 14.

The paper feed cassette 14 includes a sheet housing portion that accommodates a bundle of sheets. Near the upper right of the paper feed cassette 14, a pickup roller 151 that lets out the top layer of sheets in the sheet bundle one by one, and a paper feed roller pair 152 that feeds the sheets to the upstream end of the main conveying path P1 are provided. The sheet placed on the manual paper-feed tray 13 is also sent out through the conveying path P3 for manual feed sheets to the upstream end of the main conveying path P1. On the upstream side of the secondary transfer nip section T of the main conveying path P1, a resist roller pair 153 is disposed to feed the sheet to the transfer nip section at a specific timing.

When a single-sided printing (image formation) process is performed on the sheet, the sheet is fed from the paper feed cassette 14 or the manual paper-feed tray 13 to the main conveying path P1, and the sheet is subjected to a toner-image transfer process in the secondary transfer nip section T and to a fixing process in which the transferred toner is fixed to the sheet in the fixing device 30. Thereafter, the sheet is ejected from the sheet ejection port 12 onto the paper ejection tray 11. On the other hand, when a double-sided printing process is performed on the sheet, after the transfer process and the fixing process are performed on one side of the sheet, the sheet is partially ejected from the sheet ejection port 12 onto the paper ejection tray 11. Thereafter, the sheet is switchback-conveyed, passes through the reversing conveying path P2, and is returned to the vicinity of the upstream end of the main conveying path P1. After that, the other side of the sheet is subjected to the transfer process and the fixing process, and the sheet is ejected from the sheet ejection port 12 onto the paper ejection tray 11.

Figure 2:
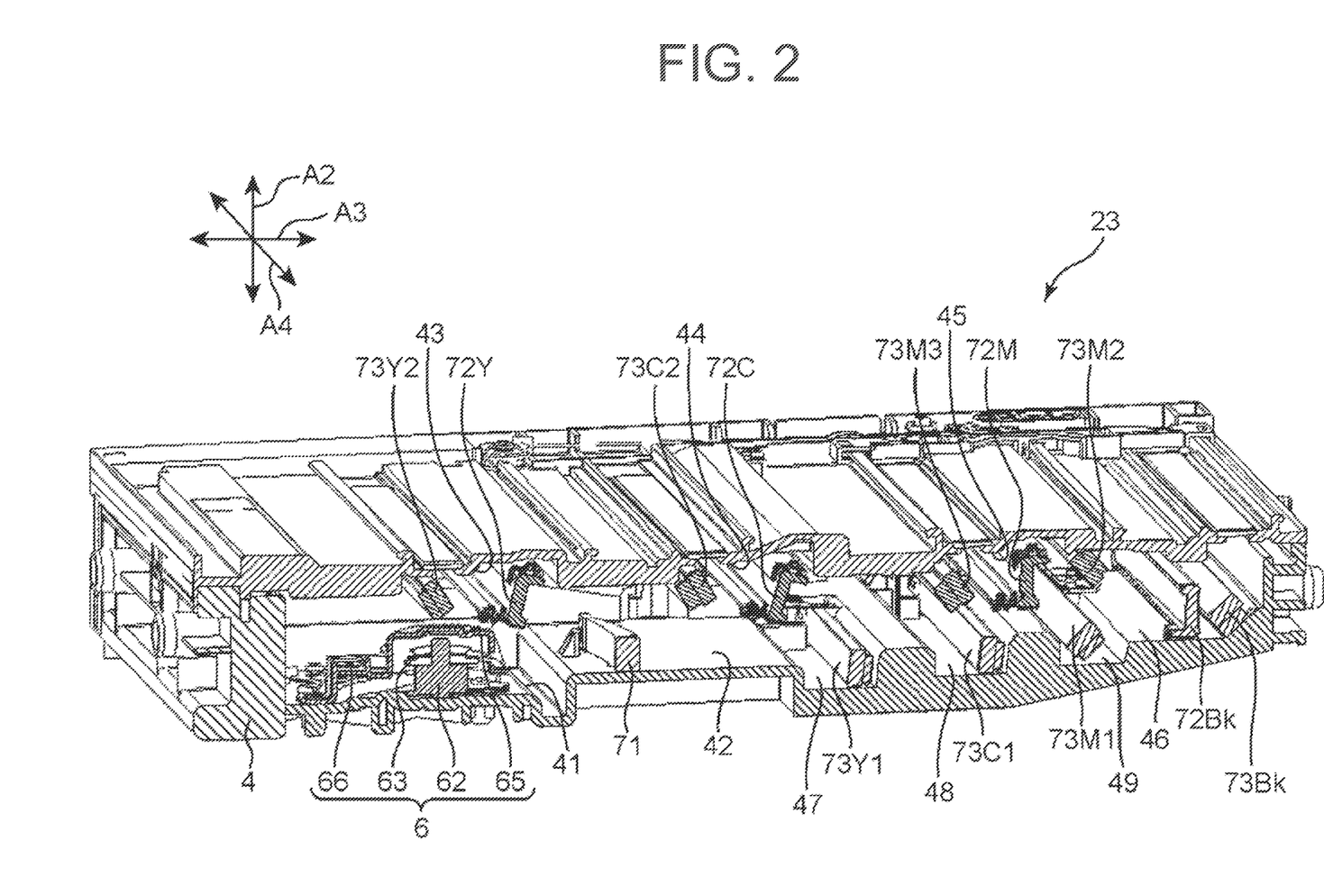
FIG. 2 is a perspective view showing a schematic configuration of an optical scanning device according to the embodiment of the present disclosure.
Figure 3:
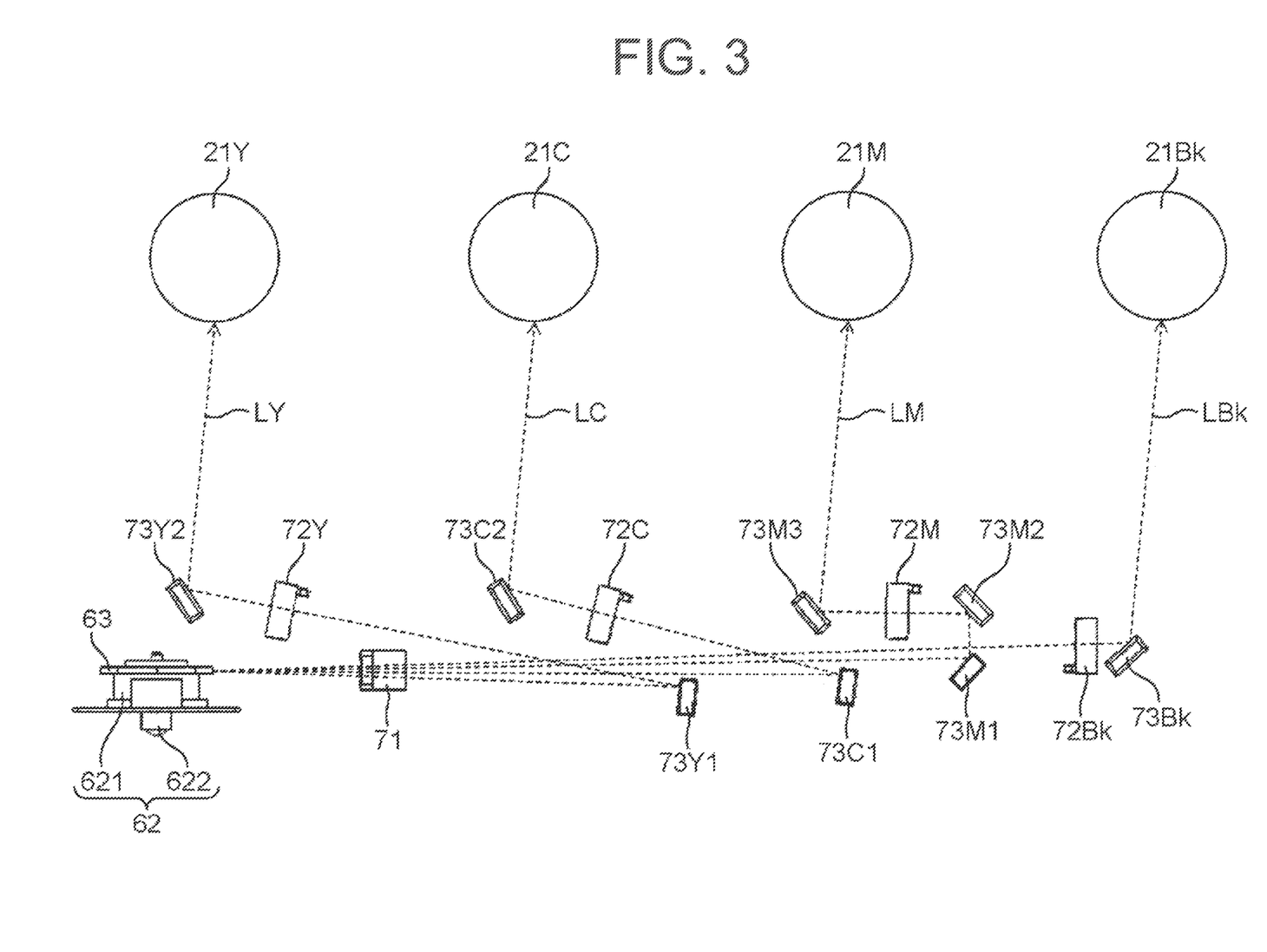
FIG. 3 is an optical path diagram showing a configuration of a sub-scanning cross section of the optical scanning device.
Figure 4:
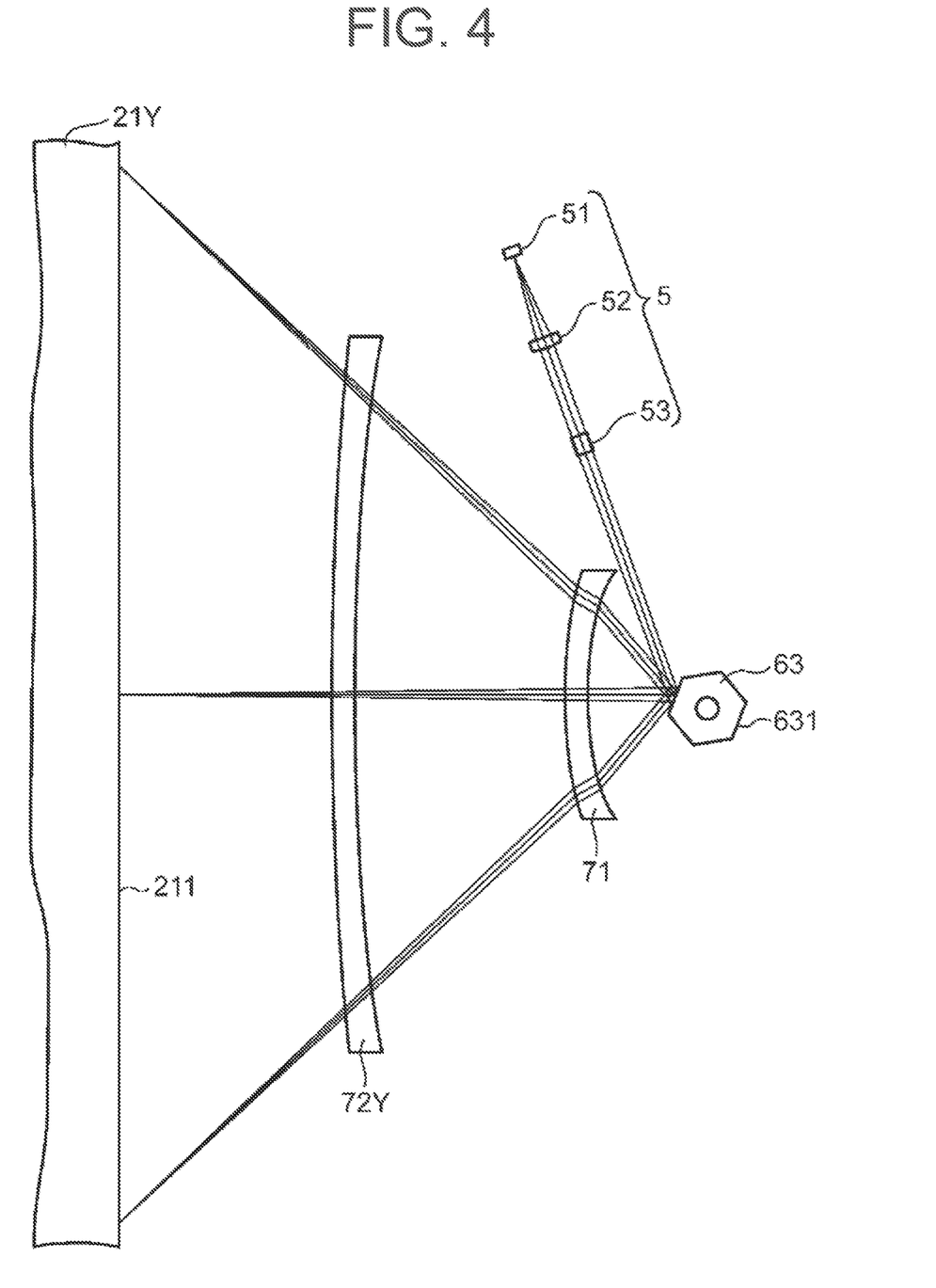
FIG. 4 is an optical path diagram showing a configuration of a main-scanning cross section of the optical scanning device.
Figure 5:
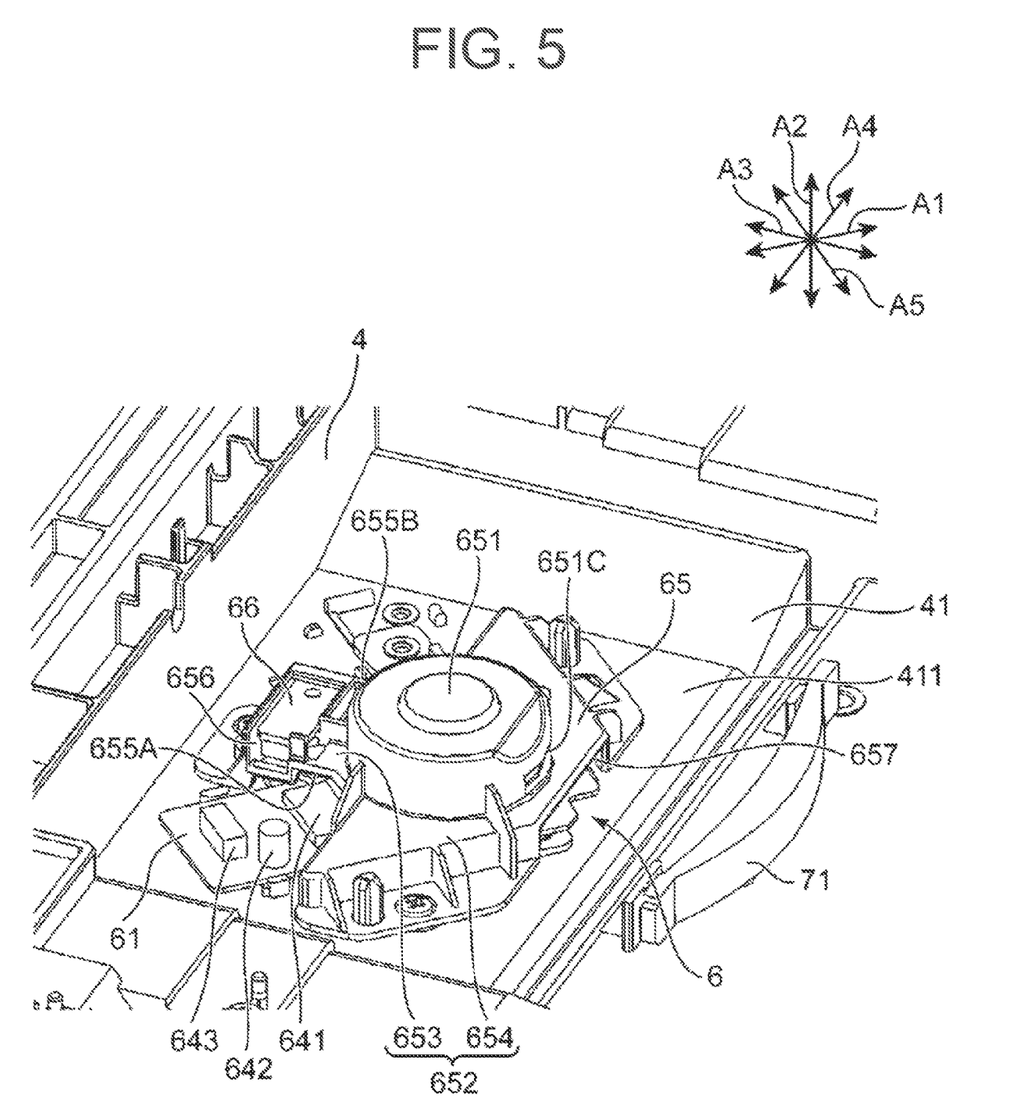
FIG. 5 is a perspective view showing a schematic configuration of an optical deflector according to the embodiment of the present disclosure.

Next, the optical scanning device 23 of the present embodiment will be described in further detail. FIG. 2 is a perspective view showing a schematic configuration of the optical scanning device 23 according to the embodiment of the present disclosure. Further, FIG. 3 is an optical path diagram showing a configuration of a sub-scanning cross-section of the optical scanning device 23, and FIG. 4 is an optical path diagram showing a configuration of a main scanning cross-section of the optical scanning device 23. Further, FIG. 5 is a perspective view showing a schematic configuration of an optical deflector 6 according to the embodiment of the present disclosure. In the following description, referring to FIG. 5, a longitudinal direction in which a substrate 61 provided in the optical deflector 6 extends is referred to as the "first direction A1", a direction orthogonal to one main surface of the substrate 61 is referred to as the "second direction A2", a direction intersecting the first direction A1 and orthogonal to the second direction A2 is referred to as the "third direction A3", a direction orthogonal to both the second direction A2 and the third direction A3 is referred to as the "fourth direction A4", and a direction orthogonal to both the first direction A1 and the second direction A2 is referred to as the "fifth direction A5". In the optical scanning device 23 which is horizontally disposed on the lower side of the image forming units 2Y, 2C, 2M, 2Bk and the intermediate transfer unit 28 in the main housing 10, the second direction A2 corresponds to the vertical direction, the third direction A3 corresponds to the left-right direction which is a movement direction of the circulating transfer belt 281, and the fourth direction A4 corresponds to the front-rear direction which is the rotation shaft direction of the photosensitive drum 21. The first direction A1 and the fifth direction A5 intersect the third direction A3 and the fourth direction A4 at an angle of approximately 45 degrees. Further, in the second direction A2 that coincides with the vertical direction, the upper side of the vertical direction is referred to as "one side" and the lower side of the vertical direction is referred to as "the other side". In the third direction A3 that coincides with the left-right direction, the left side of the left-right direction is referred to as "one side" and the right side of the left-right direction is referred to as "the other side". In the fourth direction A4 that coincides with the front-rear direction, the front side of the front-rear direction is referred to as "one side" and the rear side of the left-right direction is referred to as "the other side.

The optical scanning device 23 scans drum peripheral surfaces 211 of the first photosensitive drum 21Y for yellow, the second photosensitive drum 21C for cyan, the third photosensitive drum 21M for magenta, and the fourth photosensitive drum 21Bk for black with a yellow light beam LY which is a laser beam for drawing a yellow image, a cyan light beam LC which is a laser beam for drawing a cyan image, a magenta light beam LM which is a laser beam for drawing a magenta image, and a black light beam LBk which is a laser beam for drawing a black image, respectively.

The optical scanning device 23 includes an incident optical system 5 that is disposed in an optical path of a light beam in each color, respectively, one unit of the optical deflector 6 that is shared by the four colors, a first scanning lens 71, second scanning lenses 72Y, 72C, 72M, and 72Bk, reflection mirrors for yellow 73Y1, 73Y2 that reflect the yellow light beam LY, reflection mirrors for cyan 73C1, 73C2 that reflect the cyan light beam LC, reflection mirrors for magenta 73M1, 73M2, 73M3 that reflect the magenta light beam LM, a reflection mirror for black 73Bk that reflects the black light beam LBk, and an optical housing 4 which accommodates these mirrors. The image-forming optical system is configured by the first scanning lens 71, the second scanning lenses 72Y, 72C, 72M, 72Bk, the reflection mirrors 73Y1, 73Y2 for yellow, the reflection mirrors 73C1, 73C2 for cyan, the reflection mirrors 73M1, 73M2, 73M3 for magenta, and the reflection mirror 73Bk for black.

The optical housing 4 is a housing having a substantially cuboid shape and includes an optical-deflector housing portion 41 that serves as a region in which the optical deflector 6 is housed. The optical-deflector housing portion 41 has a mounting surface 411 on which the optical deflector 6 is placed.

The optical housing 4 also has first to eighth arrangement regions 42 to 49 as regions in which the image-forming optical system is disposed. The first arrangement region 42 is a region on the other side in the third direction A3 with respect to the optical-deflector housing portion 41. The second arrangement region 43 is a region on the one side in the second direction A2 with respect to the optical-deflector housing portion 41. The third arrangement region 44 is a region on the one side in the second direction A2 and on the other side in the third direction A3 with respect to the first arrangement region 42. The fourth arrangement region 45 is a region on the other side in the third direction A3 with respect to the third arrangement region 44. The fifth arrangement region 46 is a region on the other side in the second direction A2 and the other side in the third direction A3 with respect to the fourth arrangement region 45. The sixth arrangement region 47 is a region on the other side in the second direction A2 with respect to the third arrangement region 44. The seventh arrangement region 48 is a region on the other side in the second direction A2 with respect to the fourth arrangement region 45. The eighth arrangement region 49 is a region on the other side in the second direction A2 with respect to the fourth arrangement region 45 and between the seventh arrangement region 48 and the fifth arrangement region 46 with respect to the third direction A3.

The incident optical system 5 is accommodated in the optical housing 4 and is an optical system for causing light beams in each color to be incident into a deflection surface 631, which is the peripheral surface of the polygon mirror 63 described below. The incident optical system 5 includes a light source 51, a collimator lens 52, and a cylindrical lens 53. The light source 51 is composed of a laser element and emits a light beam that irradiates the deflection surface 631 of the polygon mirror 63. The collimator lens 52 converts the diffused light beams emitted from the light source 51 into parallel light. The cylindrical lens 53 converts the parallel light by the collimator lens 52 into a linear light long in the fourth direction A4 and causes an image to be formed on the deflection surface 631 of the polygon mirror 63. The fourth direction A4 is a direction that coincides with the front-rear direction that is the rotation shaft direction of the photosensitive drum 21 as described above, and it coincides with a main scanning direction of scanning against the photosensitive drum 21 by the optical scanning device 23.

The first scanning lens 71 is a lens having a distortion (fθ characteristic) in which an angle of the incident light beam and an image height are in a proportional relationship, and is a lengthy lens extending along the fourth direction A4 (main scanning direction). The first scanning lens 71 is disposed in the optical housing 4 in the first arrangement region 42 so as to face the deflection surface 631 of the polygon mirror 63 which will be described below. The first scanning lens 71 collects the light beams reflected by the deflection surface 631 of the polygon mirror 63.

The second scanning lens 72Y is a lens having a distortion (fθ characteristic) similarly to the first scanning lens 71, and is a lengthy lens extending along the fourth direction A4 (main scanning direction). The second scanning lens 72Y is disposed in the optical housing 4 in the second arrangement region 43. The second scanning lens 72Y collects the yellow light beam LY that has passed through the first scanning lens 71 and causes it to form an image on the drum peripheral surface 211 of the first photosensitive drum 21Y.

The second scanning lens 72C is a lens having a distortion (fθ characteristic) similarly to the first scanning lens 71 and is a lengthy lens extending along the fourth direction A4 (main scanning direction). The second scanning lens 72C is disposed in the optical housing 4 in the third arrangement region 44. The second scanning lens 72C collects the cyan light beam LC that has passed through the first scanning lens 71 and causes it to form an image on the drum peripheral surface 211 of the second photosensitive drum 21C.

The second scanning lens 72M is a lens having a distortion (fθ characteristic) similarly to the first scanning lens 71 and is a lengthy lens extending along the fourth direction A4 (main scanning direction). The second scanning lens 72M is disposed in the optical housing 4 in the fourth arrangement region 45. The second scanning lens 72M collects the magenta light beam LM that has passed through the first scanning lens 71 and causes it to form an image on the drum peripheral surface 211 of the third photosensitive drum 21M.

The second scanning lens 72Bk is a lens having a distortion (fθ characteristic) similarly to the first scanning lens 71 and is a lengthy lens extending along the fourth direction A4 (main scanning direction). The second scanning lens 72Bk is disposed in the optical housing 4 in the fifth arrangement region 46. The second scanning lens 72Bk collects the black light beam LBk that has passed through the first scanning lens 71 and causes it to form an image on the drum peripheral surface 211 of the fourth photosensitive drum 21Bk.

The reflection mirrors 73Y1 and 73Y2 for yellow reflect the yellow light beam LY on the image forming optical path of the yellow light beam LY that has passed through the first scanning lens 71. In the optical housing 4, the reflection mirror 73Y1 for yellow is disposed in the sixth arrangement region 47, and the reflection mirror 73Y2 for yellow is disposed in the second arrangement region 43.

The reflection mirrors 73C1 and 73C2 for cyan reflect the cyan light beam LC on the image forming optical path of the cyan light beam LC that has passed through the first scanning lens 71. In the optical housing 4, the reflection mirror 73C1 for cyan is disposed in the seventh arrangement region 48, and the reflection mirror 73C2 for cyan is disposed in the third arrangement region 44.

The reflection mirrors 73M1, 73M2, and 73M3 for magenta reflect the magenta light beam LM on the image forming optical path of the magenta light beam LM that has passed through the first scanning lens 71. In the optical housing 4, the reflection mirror 73M1 for magenta is disposed in the eighth arrangement region 49, and the reflection mirrors 73M2 and 73M3 for magenta are disposed in the fourth arrangement region 45.

Referring to FIG. 3, the yellow light beam LY reflected by the deflection surface 631 of the polygon mirror 63 is collected by the first scanning lens 71 and then, reflected by the reflection mirror 73Y1 for yellow, passed through the second scanning lens 72Y and then, reflected by the reflection mirror 73Y2 for yellow, and forms an image on the drum peripheral surface 211 of the first photosensitive drum 21Y The cyan light beam LC reflected by the deflection surface 631 of the polygon mirror 63 is collected by the first scanning lens 71, reflected by the reflection mirror 73C1 for cyan, passed through the second scanning lens 72C and then, reflected by the reflection mirror 73C2 for cyan, and forms an image on the drum peripheral surface 211 of the second photosensitive drum 21C. The magenta light beam LM reflected by the deflection surface 631 of the polygon mirror 63 is collected by the first scanning lens 71 and then, reflected by the reflection mirrors 73M1 and 73M2 for magenta, passed through the second scanning lens 72M and then, reflected by the reflection mirror 73M3 for magenta, and forms an image on the drum peripheral surface 211 of the third photosensitive drum 21M. The black light beam LBk reflected by the deflection surface 631 of the polygon mirror 63 is collected by the first scanning lens 71 and the second scanning lens 72Bk and then, reflected by the reflection mirror 73Bk for black, and forms an image on the drum peripheral surface 211 of the fourth photosensitive drum 21Bk.

Figure 6:
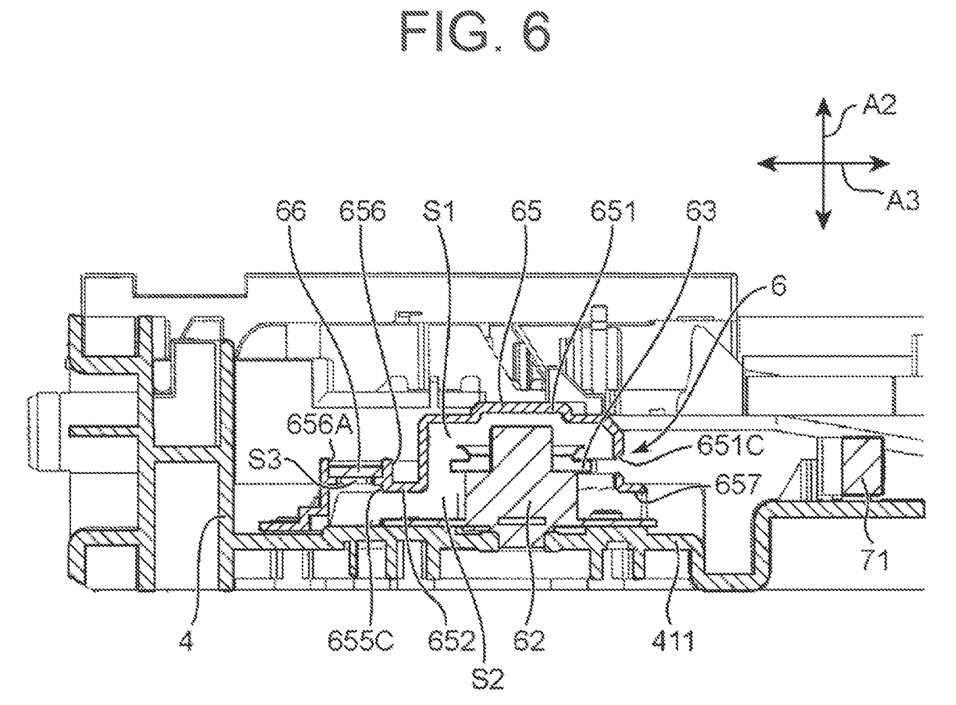
FIG. 6 is a cross-sectional view of the optical deflector.
Figure 7:
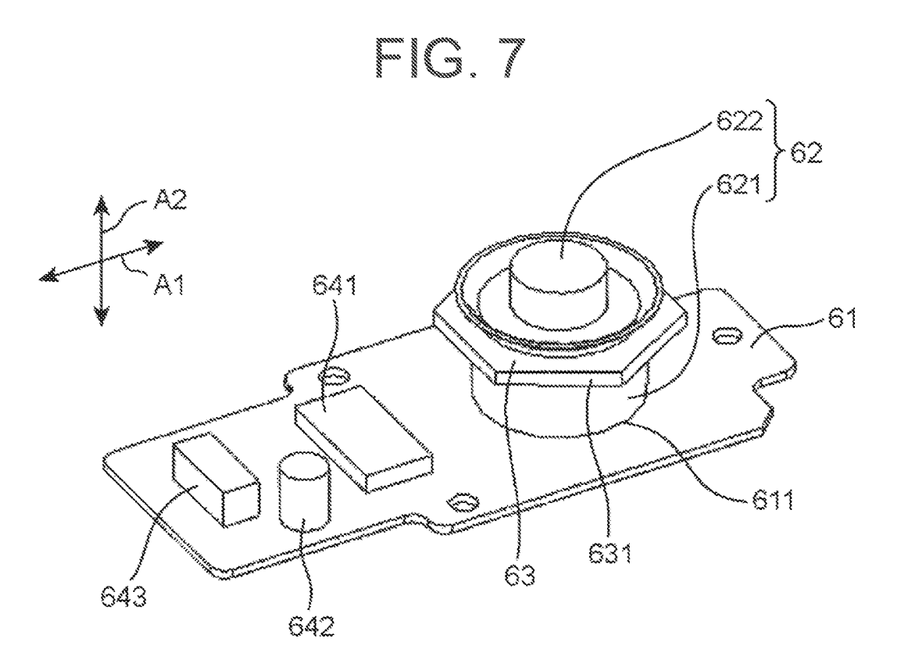
FIG. 7 is a perspective view showing a state in which a cover body is removed in the optical deflector.
Figure 8:
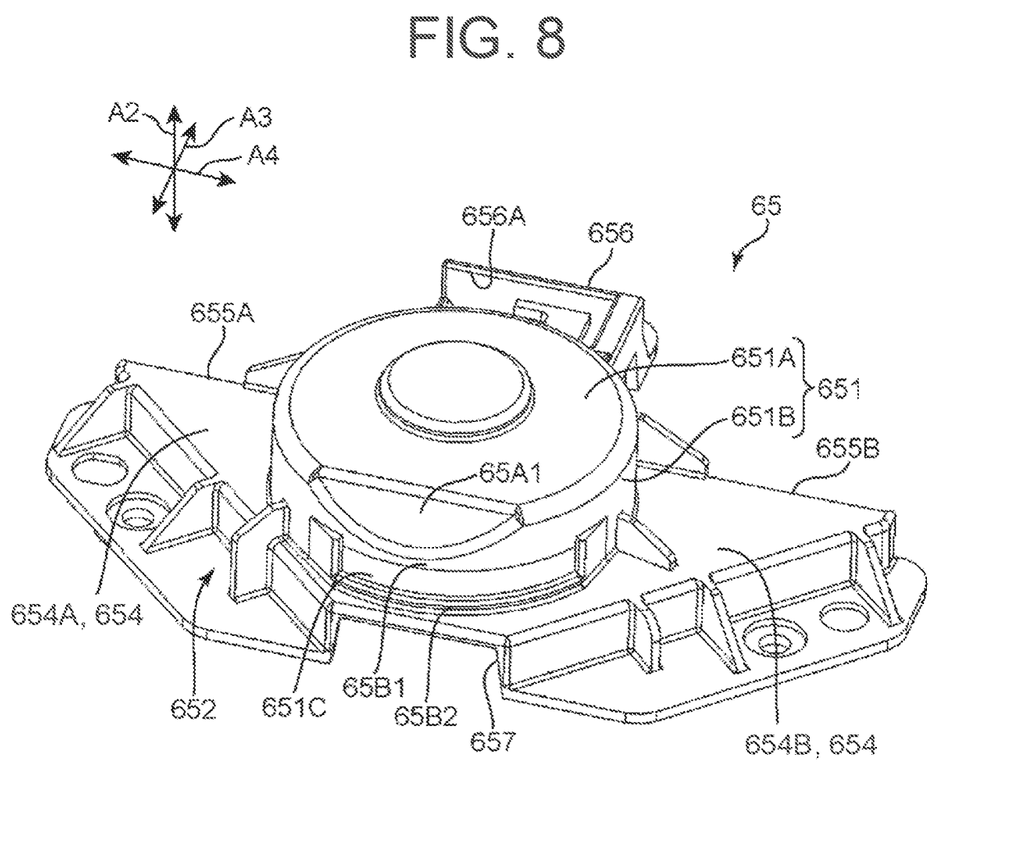
FIG. 8 is a perspective view of the cover body.
Figure 9:
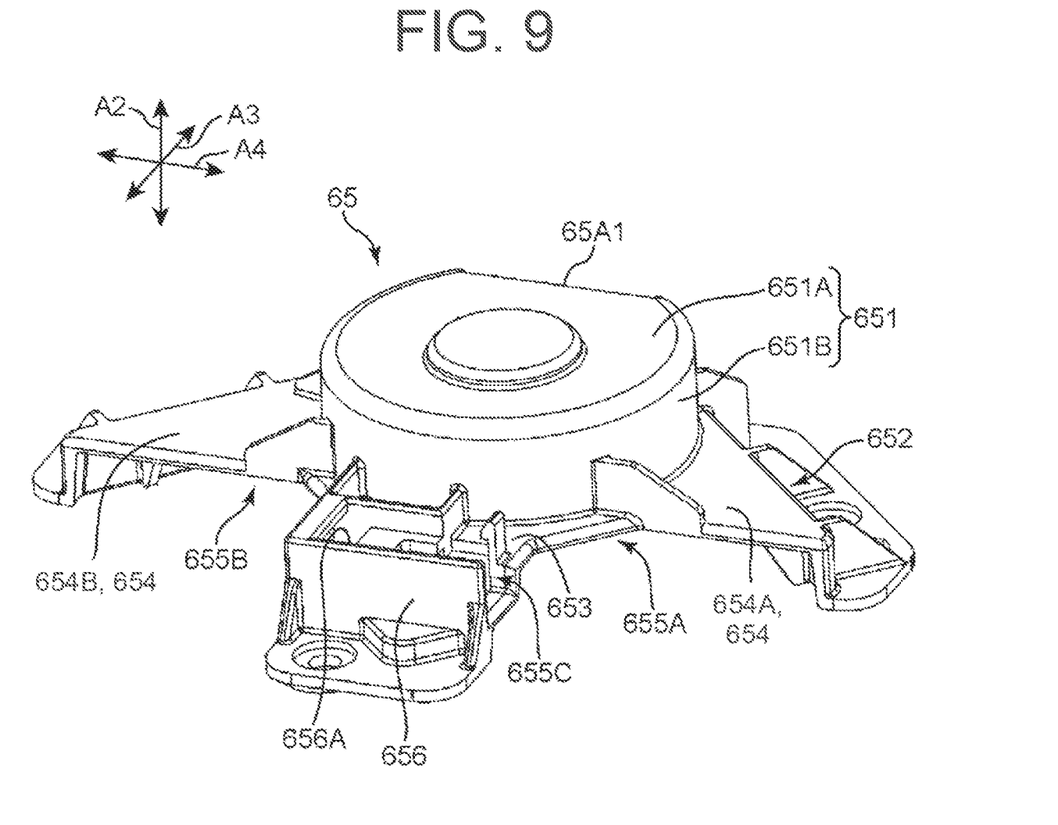
FIG. 9 is a perspective view of the cover body.
Figure 10:
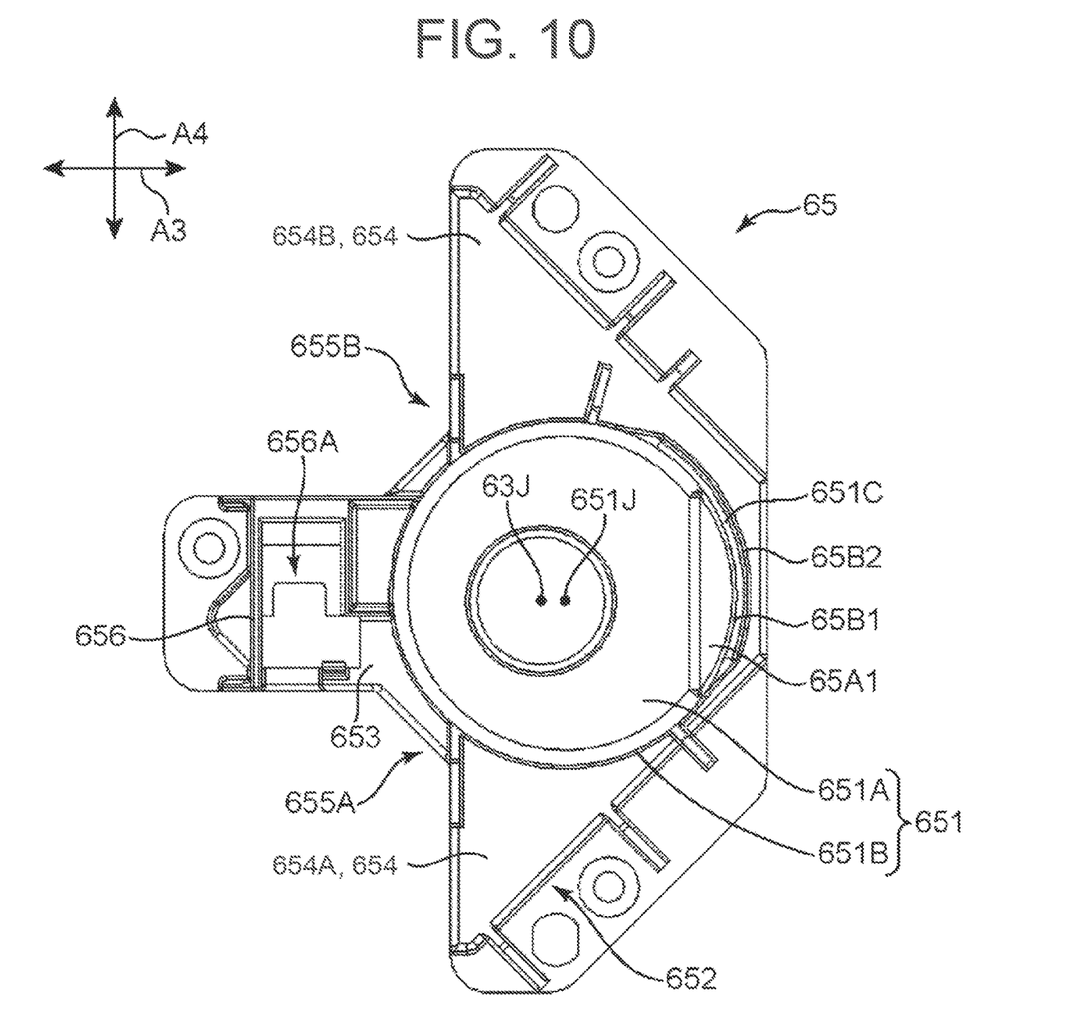
FIG. 10 is a view of the cover body when seen from above.
Figure 11:
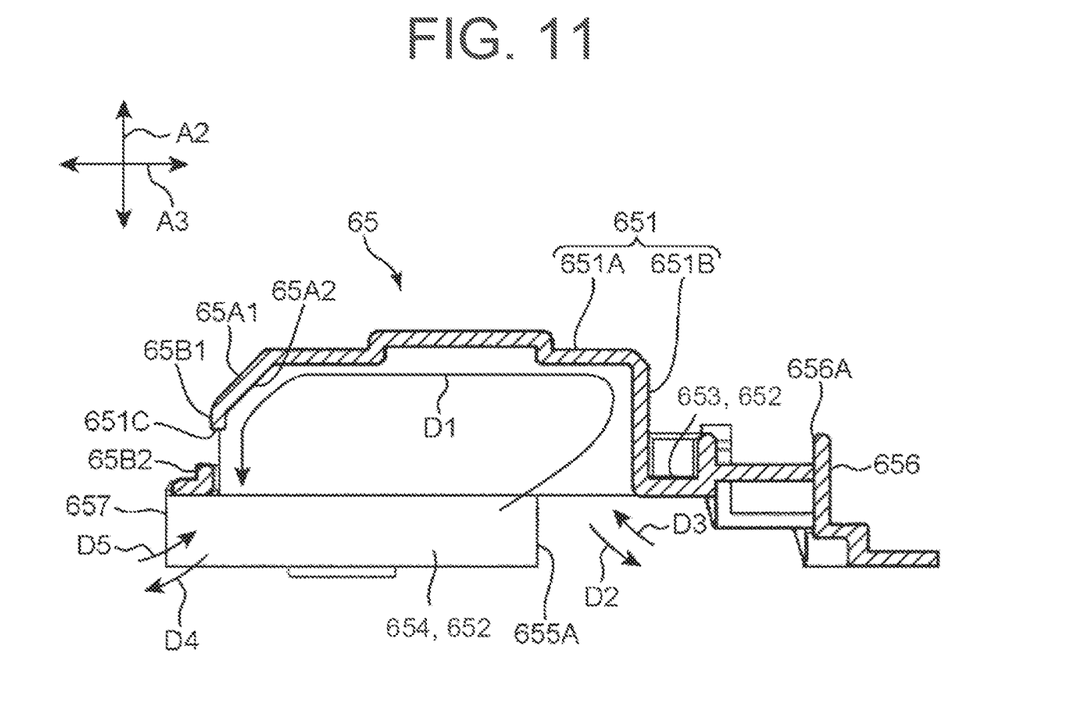
FIG. 11 is a cross-sectional view of the cover body.

Next, referring to FIGS. 2 and 5 and FIGS. 6 to 11, the optical deflector 6 will be described in detail. FIG. 6 is a cross-sectional view of the optical deflector 6, and FIG. 7 is a perspective view showing a state in which the cover body 65 is removed in the optical deflector 6. FIGS. 8 and 9 are perspective views of the cover body 65, FIG. 10 is a view of the cover body 65 when seen from above, and FIG. 11 is a cross-sectional view of the cover body 65.

The optical deflector 6 is placed on a mounting surface 411 of the optical-deflector housing portion 41 in the optical housing 4. The optical deflector 6 includes the substrate 61, a drive motor 62, the polygon mirror 63, a driver IC 641, a capacitor 642, a connector 643, the cover body 65, and a temperature detection unit 66.

Referring to FIGS. 5 and 7, the substrate 61 is a rectangular plate-shaped circuit board having a through hole 611 and having a specific length in the first direction A1. The longitudinal direction of the substrate 61 coincides with the first direction A1. The substrate 61 is fixed to the mounting surface 411 of the optical-deflector housing portion 41 in the optical housing 4. The drive motor 62 includes a motor body 621 and a rotation shaft 622. In the drive motor 62, the rotation shaft 622 protrudes upward from the motor body 621, extends in the second direction A2 perpendicular to one main surface of the substrate 61, and is rotatably inserted into the through hole 611. The drive motor 62 is configured so that, when a drive current is input to the motor body 621, the rotation shaft 622 rotates around the axis center. The drive motor 62 is fixed to the mounting surface 411 of the optical-deflector housing portion 41 in the optical housing 4.

The polygon mirror 63 is a polyhedral mirror with six deflection surfaces 631 formed along each side of a regular hexagon. In the polygon mirror 63, the deflection surface 631 is irradiated with light beams emitted from the light source 51 of the incident optical system 5. The polygon mirror 63 is mounted at the upper end portion on one side in the second direction A2 of the rotation shaft 622 and rotates in unison with the rotation shaft 622. The polygon mirror 63 deflects the light beams irradiating the deflection surface 631 while rotating in unison with the rotation shaft 622 and causes the photosensitive drum 21 to be scanned.

The driver IC 641 is an electronic component that controls driving of the drive motor 62. The driver IC 641 is mounted on a region on one main surface of the substrate 61 that is separated from the through hole 611 to one side in the first direction A1. The driver IC 641 supplies a drive current to the motor body 621. The capacitor 642 is an electronic component that rectifies a control current and the like input to the driver IC 641. The capacitor 642 is mounted on a region closer to one side in the first direction A1 than the driver IC 641 on one main surface of the substrate 61. The connector 643 is electrically connected to a control system that controls an image forming operation in the image forming apparatus 1, and accepts control signals input from the control system into the optical deflector 6. The connector 643 is mounted in a region adjacent to the capacitor 642 on one main surface of the substrate 61.

As shown in FIG. 6 and FIGS. 8 to 11, the cover body 65 is a cover which covers the polygon mirror 63 and the drive motor 62, and is fixed to the mounting surface 411 of the optical-deflector housing portion 41 in the optical housing 4. The cover body 65 has a function of suppressing noise by wind noise generated by rotation of the polygon mirror 63 and suppressing adhesion of dusts or the like to the polygon mirror 63. The cover body 65 includes a first cover portion 651 and a second cover portion 652.

The first cover portion 651 covers the polygon mirror 63 from one side in the second direction A2 and defines a first space S1 in which the polygon mirror 63 is disposed in the cover body 65. In this first cover portion 651, a first opening 651C opened by facing the deflection surface 631 of the polygon mirror 63 is formed. Specifically, the first cover portion 651 includes a top wall 651A and a peripheral wall 651B. The top wall 651A is a disc-shaped wall portion and is disposed on one side in the second direction A2 with respect to the polygon mirror 63, in parallel with the mounting surface 411 of the optical-deflector housing portion 41 in the optical housing 4. The peripheral wall 651B is a cylindrical wall portion extending from an outer peripheral end edge of the top wall 651A toward the other side in the second direction A2, and the lower end (the end portion on the other side in the second direction A2) is connected to the second cover portion 652. The peripheral wall 651B has the above-described first opening 651C which is opened by facing the deflection surface 631 of the polygon mirror 63. The first opening 651C is formed having a long hole shape along the circumferential direction in a region portion on the other side in the third direction A3 of the peripheral wall 651B. The first opening 651C has a function as an opening to guide light beams emitted from the light source 51 of the incident optical system 5 into an inside of the cover body 65 and to guide light beams deflected by the deflection surface 631 of the polygon mirror 63 to an outside of the cover body 65. A more detailed configuration of the first cover portion 651 will be described below.

The second cover portion 652 is connected to the end portion (lower end) on the other side in the second direction A2 in the first cover portion 651, and covers the drive motor 62 from the side. The second cover portion 652 defines a second space S2 in which the drive motor 62 is disposed in communication with the first space S1 of the first cover portion 651. In the second cover portion 652, a second opening 655A opened by facing the motor body 621 of the drive motor 62 is formed. The second opening 655A is formed in a region portion on one side in the third direction A3 in the second cover portion 652. That is, the first opening 651C of the first cover portion 651 and the second opening 655A of the second cover portion 652 are faced with each other with respect to the third direction A3. In this embodiment, the second cover portion 652 includes a first extension portion 653 and a second extension portion 654. The first extension portion 653 is a portion that extends from the first cover portion 651 to one side in the third direction A3. The second extension portion 654 is a portion that extends from the first cover portion 651 in the fourth direction A4. In this case, the second opening 655A is formed over the first extension portion 653 and the second extension portion 654.

Further, the second extension portion 654 has a first portion 654A and a second portion 654B. The first portion 654A is a portion that extends from the first cover portion 651 to one side in the fourth direction A4. The second portion 654B is a portion that extends from the first cover portion 651 to the other side in the fourth direction A4. In the second extension portion 654, the first portion 654A and the second portion 654B are integrally formed. In this case, the second opening 655A is formed over the first extension portion 653 and the first portion 654A in the second extension portion 654. The substrate 61 is inserted into the second opening 655A. In this case, the driver IC 641 is disposed so as to be contained in the opening area of the second opening 655A when the second opening 655A is viewed from the first direction A1 (see FIG. 5).

Further, in the present embodiment, a third opening 655B which is different from the second opening 655A is formed in the second cover portion 652. The third opening 655B is an opening opened by facing the motor body 621 of the drive motor 62 and is formed over the first extension portion 653 and the second portion 654B in the second extension portion 654. The third opening 655B is faced with the first opening 651C of the first cover portion 651 with respect to the third direction A3 similarly to the second opening 655A. A second substrate other than the substrate 61 is inserted into the third opening 655B.

The cover body 65 includes a third cover portion 656 other than the first cover portion 651 and the second cover portion 652. The third cover portion 656 is a portion defining a third space S3 that communicates with the second space S2 of the second cover portion 652. In the present embodiment, the third cover portion 656 is disposed on one side in the second direction A2 of the first extension portion 653 in the second cover portion 652 and defines the third space S3 that communicates with the second space S2 of the second cover portion 652. Specifically, in the first extension portion 653 of the second cover portion 652, a fourth opening 655C which is opened to one side in the second direction A2 is formed. The third cover portion 656 is formed having a cylindrical shape extending from an opening end edge of the fourth opening 655C toward one side in the second direction A2 so as to enclose the fourth opening 655C of the first extension portion 653. The third cover portion 656 as above is configured to have a fifth opening 656A at an end portion on one side in the second direction A2 and to define the third space S3 that communicates with the second space S2 of the second cover portion 652 through the fourth opening 655C. In the optical deflector 6 of the present embodiment, the temperature detection unit 66 is mounted on the third cover portion 656 so as to block the third space S3 (see FIGS. 5 and 6). The temperature detection unit 66 detects an internal temperature of the cover body 65.

Further, a sixth opening 657 is formed in the second cover portion 652 at a position directly below the first opening 651C of the first cover portion 651. This sixth opening 657 is an opening for dissipating heat emitted from the drive motor 62 to the outside of the cover body 65.

Details of the first cover portion 651 will be described with reference to FIGS. 8 to 11. As already described, the first cover portion 651 is configured by including the top wall 651A disposed above the polygon mirror 63 and the peripheral wall 651B formed having a cylindrical shape extending downward from the outer peripheral end edge of the top wall 651A and having the first opening 651C opened by facing the deflection surface 631 of the polygon mirror 63.

The peripheral wall 651B has an upper-end edge-defining portion 65B1 and a lower-end edge-defining portion 65B2 that define an opening end edge of the first opening 651C. The upper-end edge-defining portion 65B1 is a portion in the peripheral wall 651B that defines the upper end edge of the opening end edge of the first opening 651C and is connected to the top wall 651A. The lower-end edge-defining portion 65B2 is a portion in the peripheral wall 651B that defines the lower end edge of the opening end edge of the first opening 651C and is connected to the second cover portion 652.

The top wall 651A has, on the inner surface side of a specific portion 65A1 connected to the upper-end edge-defining portion 65B1, a first slope portion 65A2 that is inclined downward (the other side in the second direction A2) toward the upper-end edge-defining portion 65B1 (see FIG. 11). The first slope portion 65A2 may be configured by a flat surface inclined downward or by a curved surface curved along an upward projecting arc inclined downward.

As explained above, in the optical deflector 6 according to the present embodiment, the polygon mirror 63 and the drive motor 62 are covered by the cover body 65 including the first cover portion 651 in which the first opening 651C is formed and the second cover portion 652 connected to the lower end of the first cover portion 651. In the optical deflector 6 configured by including the cover body 65, when the polygon mirror 63 rotates in unison with the rotation shaft 622 of the drive motor 62, an air stream of an air flow is generated inside the cover body 65 (see FIG. 11). Although there are a wide variety of air flow directions inside the cover body 65, the rotation of the polygon mirror 63 generates a main airflow D1 that rises from the second cover portion 652 toward the first cover portion 651 and flows along the inner surface of the top wall 651A of the first cover portion 651. This main airflow D1 is the strongest airflow among the airflows generated by the rotation of the polygon mirror 63. That is, the polygon mirror 63 is configured to generate the main airflow D1 inside the cover body 65 by rotation in unison with the rotation shaft 622.

Here, in the first cover portion 651, the first slope portion 65A2 is formed on the inner surface side of the specific portion 65A1 of the top wall 651A connected to the upper-end edge-defining portion 65B1 of the peripheral wall 651B. Thus, the flow direction of the main airflow D1 flowing along the inner surface of the top wall 651A is changed by the first slope portion 65A2 to a downward direction (the other side in the second direction A2) toward the upper-end edge-defining portion 65B1 of the peripheral wall 651B. As a result, in the vicinity of the first opening 651C of the peripheral wall 651B, the main airflow D1 forms a downward airflow from the upper-end edge-defining portion 65B1 to the lower-end edge-defining portion 65B2. The aforementioned main airflow D1, which forms the downward airflow in the vicinity of the first opening 651C of the peripheral wall 651B functions as an air curtain which blocks the first opening 651C with the airflow. As a result, entry of dusts or the like into the cover body 65 through the first opening 651C can be suppressed as much as possible by using the aforementioned main airflow D1 generated by the rotation of the polygon mirror 63. Thus, adhesion of dusts or the like to the deflection surface 631 of the polygon mirror 63 is effectively suppressed, and accurate optical scanning of the photosensitive drum 21 as the irradiated body by the polygon mirror 63 can be realized.

Further, as shown in FIG. 11, in the peripheral wall 651B, the lower-end edge-defining portion 65B2 is desirably located closer to an outer side than the upper-end edge-defining portion 65B1. This can prevent deterioration of the function of the main airflow D1 in the vicinity of the first opening 651C of the peripheral wall 651B as an air curtain which blocks the first opening 651C.

Figure 12:
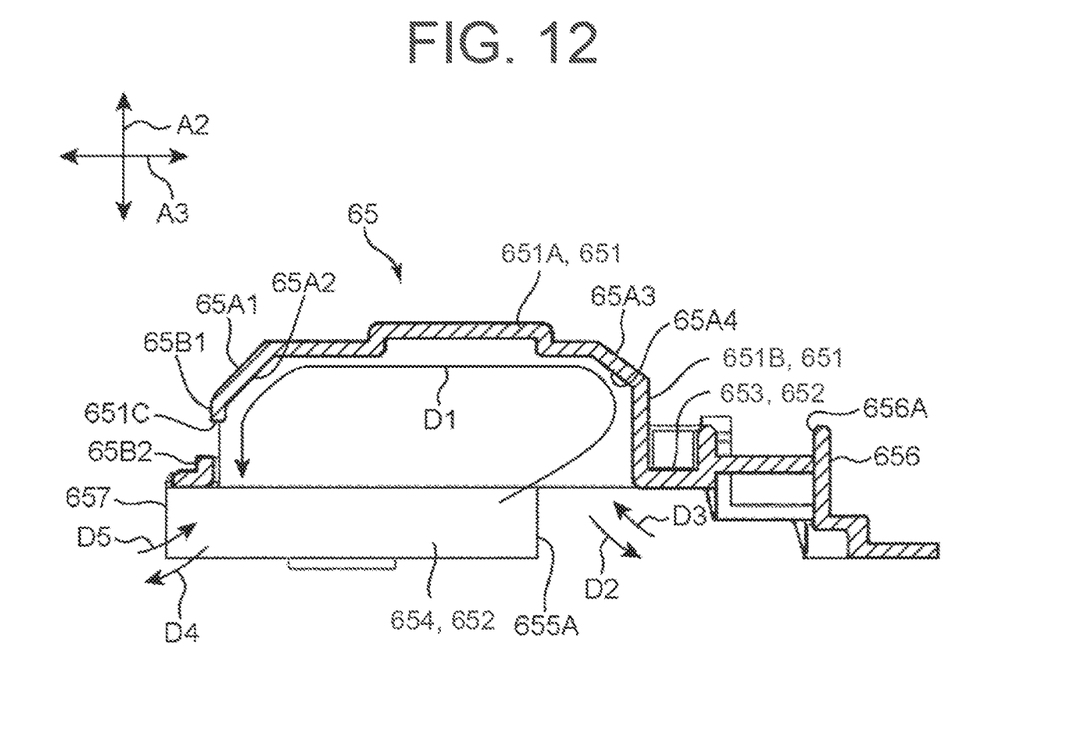
FIG. 12 is a cross-sectional view showing a variation of the cover body.

Further, as shown in the variation of FIG. 12, the top wall 651A may be configured to further have a second slope portion 65A4 which is inclined downward toward the outer side on the inner surface side of a symmetrical portion 65A3 which is in a linearly symmetrical positional relationship with the rotation shaft 622 as the axis of symmetry with respect to the specific portion 65A1. The second slope portion 65A4 functions to guide air rising from the second cover portion 652 toward the first cover portion 651 by rotation of the polygon mirror 63 along the inner surface of the top wall 651A to the first slope portion 65A2. This makes it possible to strengthen the flow of the main airflow D1 in the vicinity of the first opening 651C of the peripheral wall 651B. Therefore, the function of the main airflow D1 in the vicinity of the first opening 651C of the peripheral wall 651B as an air curtain which blocks the first opening 651C can be increased.

As shown in FIGS. 11 and 12, airflows generated by the rotation of the polygon mirror 63 include, for example, airflows D2 and D3 passing through the second opening 655A and the third opening 655B formed in the second cover portion 652, and airflows D4 and D5 passing through the sixth opening 657 formed in the second cover portion 652, in addition to the aforementioned main airflow D1. The airflow D4 is a flow of air from the inside to the outside of the cover body 65 through the sixth opening 657. The airflow D5 is a flow of air from the outside to the inside of the cover body 65 through the sixth opening 657.

The airflow D2 is a flow of air from the inside to the outside of the cover body 65 through the second opening 655A (the third opening 655B). The airflow D3 is a flow of air from the outside of the cover body 65 to the inside through the second opening 655A (the third opening 655B). As described above, the substrate 61 is inserted into the second opening 655A, and the second substrate is inserted into the third opening 655B. Therefore, the airflows D2 and D3 passing through the second opening 655A pass over the substrate 61 on which the electronic components such as the driver IC 641 are mounted, and the airflows D2 and D3 passing through the third opening 655B pass over the second substrate. As a result, the airflows D2 and D3 generated by the rotation of the polygon mirror 63 can be used to cool the electronic components such as the driver IC 641 that generates heat as the polygon mirror 63 rotates. Thus, the temperature rise of the electronic components such as the driver IC 641 is suppressed and an operation failure of the electronic components due to the temperature rise is effectively prevented.

Further, the deterrence of noise by the cover body 65 due to wind noise generated by the rotation of the polygon mirror 63 is correlated with a separation distance between the opening end edge of the first opening 651C formed in the first cover portion 651 and the deflection surface 631 of the polygon mirror 63. Specifically, when the separation distance becomes shorter than a specific value, a high-frequency wind noise generated by the rotation of the polygon mirror 63 leaks from the first opening 651C and becomes noise. Therefore, in the optical deflector 6 according to the present embodiment, as shown in FIG. 10, the polygon mirror 63 is disposed inside the first cover portion 651 so that a rotation center 63J (axis center of the rotation shaft 622) of the polygon mirror 63 is located at a position separated from a center 651J of the first cover portion 651 only by a specific distance to one side in the third direction A3. As a result, the deflection surface 631 of the polygon mirror 63 can be prevented from being too close to the opening end edge of the first opening 651C. Therefore, the cover body 65 can suppress noise due to wind noise generated by the rotation of the polygon mirror 63.

What is claimed is:

1. An optical deflector comprising:

a drive motor having a motor body and a rotation shaft projecting upward from the motor body;

a polygon mirror attached to an upper end portion of the rotation shaft, having a peripheral surface which is irradiated with light, deflecting the light with which the peripheral surface is irradiated while rotating in unison with the rotation shaft, and scanning a specific irradiated body; and a cover body including a first cover portion that covers the polygon mirror from above and a second cover portion that is connected to a lower end of the first cover portion and covers the drive motor from a side, wherein the first cover portion has:

a plate-shaped top wall disposed above the polygon mirror; and a peripheral wall formed having a cylindrical shape extending downward from an outer peripheral end edge of the top wall, with a lower end connected to the second cover portion, and having an opening opened by facing the peripheral surface of the polygon mirror;

the peripheral wall has an upper-end edge-defining portion that defines an upper end edge of an opening end edge of the opening and is connected to the top wall, and a lower-end edge-defining portion that defines a lower end edge of the opening end edge and is connected to the second cover portion; and the top wall has, on an inner surface side of a specific portion connected to the upper-end edge-defining portion, a first slope portion that is inclined downward toward the upper-end edge-defining portion, wherein the top wall further has, on an inner surface side of a symmetrical portion in a linearly symmetrical positional relationship with respect to the specific portion with the rotation shaft as the axis of symmetry, a second slope portion that is inclined downward toward an outer side and the second slope portion has a curved surface curved along an upward projecting arc inclined downward.

2. The optical deflector according to claim 1, wherein in the peripheral wall, the lower-end edge-defining portion is located closer to an outer side than the upper-end edge-defining portion.

3. An optical scanning device, comprising:

the optical deflector according to claim 1; and a light source that irradiates the peripheral surface of the polygon mirror with light.

4. An image forming apparatus, comprising:

the optical scanning device according to claim 3; and an image carrier as the irradiated body, which is scanned by the polygon mirror and having a surface on which an electrostatic latent image is formed.

\* \* \* \* \*